US012361507B2

(12) United States Patent
Aderholdt et al.

(10) Patent No.: US 12,361,507 B2
(45) Date of Patent: Jul. 15, 2025

(54) POSITION MONITORING SYSTEM AND METHOD

(71) Applicant: The Government of the United States of America, as represented by the Secretary of Homeland Security, Washington, DC (US)

(72) Inventors: Matthew R. Aderholdt, Vineland, NJ (US); Lee J. Spanier, Linwood, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/937,200

(22) Filed: Nov. 5, 2024

(65) Prior Publication Data

US 2025/0156981 A1    May 15, 2025

Related U.S. Application Data

(60) Provisional application No. 63/599,392, filed on Nov. 15, 2023.

(51) Int. Cl.
*G06Q 10/10* (2023.01)
*G01G 19/44* (2006.01)
(Continued)

(52) U.S. Cl.
CPC .......... *G06Q 50/265* (2013.01); *G01G 19/44* (2013.01); *G06V 20/52* (2022.01)

(58) Field of Classification Search
CPC ....... G06Q 50/265; G01G 19/44; G06V 20/52
(Continued)

(56) References Cited

U.S. PATENT DOCUMENTS

| 9,165,265 B2* | 10/2015 | Gilbert | .................. B64F 1/366 |
| 2012/0086550 A1* | 4/2012 | LeBlanc | .................. G07C 9/37 |
| | | | 340/5.82 |

(Continued)

FOREIGN PATENT DOCUMENTS

CN    108896151 A    * 11/2018

OTHER PUBLICATIONS

CN_108896151_A1—Translation, Nov. 27, 2018 (Year: 2018).*

*Primary Examiner* — Jonathan P Ouellette
(74) *Attorney, Agent, or Firm* — Kelly G. Hyndman; Robert W. Busby

(57) ABSTRACT

In an example, a monitoring method for screening an individual, the monitoring method comprising: performing a pre-checkpoint monitoring of a stance of the individual as the individual's stance to collect baseline data including weight distribution and balance of the individual as the individual's weight distribution and balance; performing a pre-scanning monitoring of the individual's stance at a scanning system at a checkpoint to collect pre-scanning monitoring data prior to scanning the individual by the scanning system; and comparing the pre-scanning monitoring data with the baseline data to determine whether the pre-scanning monitoring data falls below a pre-scanning threshold with respect to the baseline data, the individual resetting the individual's stance at the scanning system until the pre-scanning monitoring data is below the pre-scanning threshold with respect to the baseline data before scanning the individual at the scanning system.

23 Claims, 12 Drawing Sheets

(51) Int. Cl.
   *G06Q 10/06* (2023.01)
   *G06Q 30/02* (2023.01)
   *G06Q 30/06* (2023.01)
   *G06Q 40/08* (2012.01)
   *G06Q 50/26* (2012.01)
   *G06V 20/52* (2022.01)

(58) Field of Classification Search
   USPC .................................................. 705/1.1–912
   See application file for complete search history.

(56) References Cited

U.S. PATENT DOCUMENTS

2020/0320814 A1* 10/2020 Hastings .................. G01V 5/20
2021/0312201 A1* 10/2021 Hastings ................. G06V 20/10
2022/0026530 A1* 1/2022 Wu ......................... G01S 7/006

* cited by examiner

POSITION MONITORING SYSTEM AND METHOD

CROSS-REFERENCE TO RELATED APPLICATIONS

The application is a nonprovisional of and claims the benefit of priority from U.S. Provisional Patent Application No. 63/599,392 filed on Nov. 15, 2023, entitled POSITION MONITORING SYSTEM AND METHOD, the entire disclosures of which are incorporated by reference.

SUMMARY STATEMENT OF GOVERNMENT INTEREST

The present invention was made with support from the United States Department of Homeland Security (DHS) and by an employee of DHS in the performance of their official duties. The U.S. Government has certain rights in this invention.

FIELD

The discussion below relates generally to position monitoring and, more particularly, to pressure mapping systems configured to verify the screening quality of individuals such as aviation passengers in airports.

BACKGROUND

Advanced imaging technology (AIT) safely screens passengers without physical contact for both metallic and non-metallic threats, including weapons and explosives, which may be concealed under a passenger's clothing. AIT uses Automatic Threat Recognition (ATR) software that eliminates passenger-specific images and instead auto-detects potential threats by indicating their location on a generic outline of a person. Transportation Security Agency (TSA) uses AIT to screen passengers at checkpoints. When aviation passengers do not follow the TSA stance protocol and the Transportation Security Officer is not vigilant to visually detect it, the detection performance of an AIT system may be affected.

SUMMARY

In addition to situations where aviation passengers do not follow the TSA stance protocol, there may be stance scenarios that cannot be detected which represent risks of interest. A pressure mapping system offers various alternative solutions by monitoring aviation passengers before and within the airport checkpoint. Furthermore, the solution can be applied to alarm resolution by minimizing passenger pat downs following a positive alarm via AIT or Walk-Through Metal Detector in sensitive areas of the body. The technology can be applied to checkpoint and screening applications beyond the TSA or travel security.

Embodiments of the present invention are directed to a sensor system that offers an alternative solution to address the risk of invalid or improper security screening by detecting any static stance imbalance between two feet and/or detecting any passenger motion or instability using highly sensitive pressure pads under the feet. This disclosure introduces the sensor system to detect sufficient equal and stable balance between two feet as a prerequisite to initiating an AIT scan or judging the quality of the scan.

In some embodiments, COTS (Commercial Off The Shelf) pressure sensor maps and associated software are used to develop a threshold for each of various improper stance scenarios that will result in an alarm to the security check operator who will direct the individual to be rescanned.

In accordance with an aspect, a monitoring method for screening an individual comprises: performing a pre-checkpoint monitoring of a stance of the individual as the individual's stance to collect baseline data including weight distribution and balance of the individual as the individual's weight distribution and balance; performing a pre-scanning monitoring of the individual's stance at a scanning system at a checkpoint to collect pre-scanning monitoring data prior to scanning the individual by the scanning system; and comparing the pre-scanning monitoring data with the baseline data to determine whether the pre-scanning monitoring data falls below a pre-scanning threshold with respect to the baseline data, the individual resetting the individual's stance at the scanning system until the pre-scanning monitoring data is below the pre-scanning threshold with respect to the baseline data before scanning the individual at the scanning system.

Another aspect is directed to a monitoring system for screening an individual. The monitoring system comprises a processor and a memory. A pre-checkpoint module is configured to perform a pre-checkpoint monitoring of a stance of the individual as the individual's stance to collect baseline data including weight distribution and balance of the individual as the individual's weight distribution and balance. A checkpoint module is configured to perform a pre-scanning monitoring of the individual's stance at a scanning system at a checkpoint to collect pre-scanning monitoring data prior to scanning the individual by the scanning system. A resolution module is configured to compare the pre-scanning monitoring data with the baseline data to determine whether the pre-scanning monitoring data falls below a pre-scanning threshold with respect to the baseline data, the individual resetting the individual's stance at the scanning system until the pre-scanning monitoring data is below the pre-scanning threshold with respect to the baseline data before scanning the individual at the scanning system.

Another aspect is directed to a nontransitory computer-readable storage medium storing a monitoring program. The monitoring program includes instructions that, when executed by a processor, causes a monitoring system for screening an individual to: perform a pre-checkpoint monitoring of a stance of the individual as the individual's stance to collect baseline data including weight distribution and balance of the individual as the individual's weight distribution and balance; perform a pre-scanning monitoring of the individual's stance at a scanning system at a checkpoint to collect pre-scanning monitoring data prior to scanning the individual by the scanning system; and compare the pre-scanning monitoring data with the baseline data to determine whether the pre-scanning monitoring data falls below a pre-scanning threshold with respect to the baseline data, the individual resetting the individual's stance at the scanning system until the pre-scanning monitoring data is below the pre-scanning threshold with respect to the baseline data before scanning the individual at the scanning system.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

Overview

Figure 1:
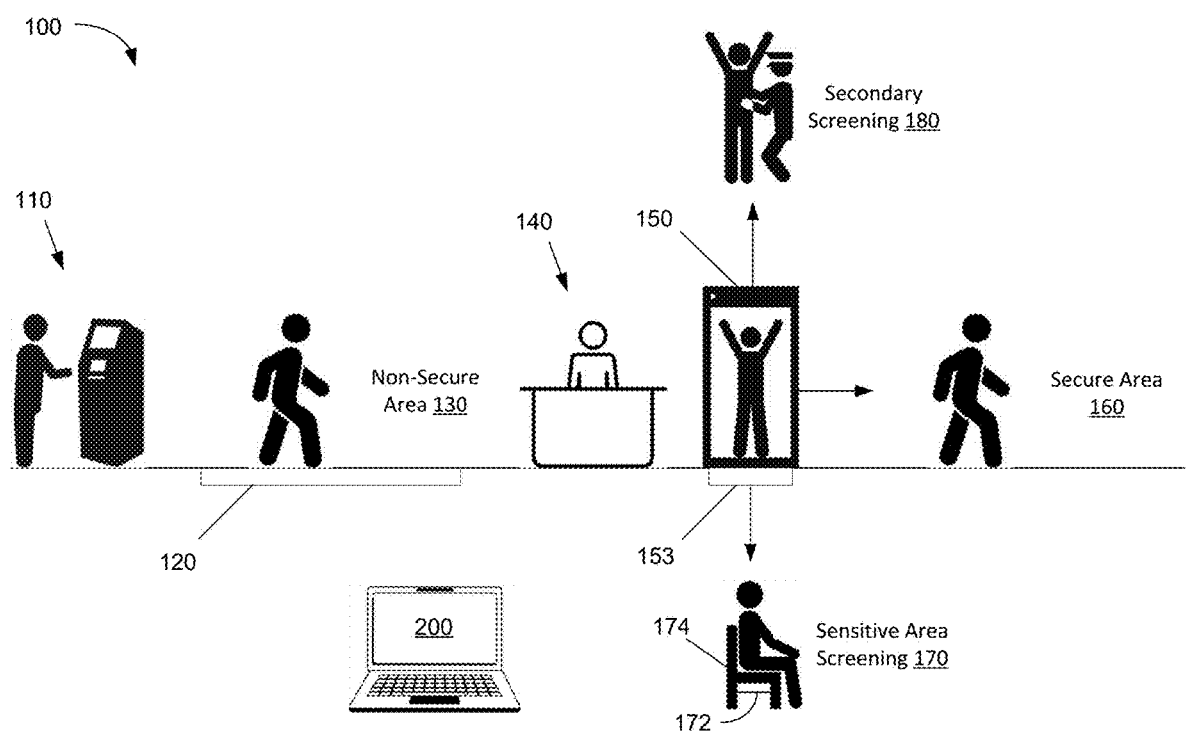
FIG. 1 is a flow diagram illustrating an example of a pre-checkpoint flow.

FIG. 1 is a schematic diagram 100 illustrating a security screening process according to an embodiment. An individual or passenger or client scans documents at a pre-checkpoint kiosk 110. The documents may include identification, travel or access documents, and the like. The individual walks over a covert pre-checkpoint pressure mapping system 120, which performs pre-checkpoint monitoring of the individual's weight, walking cadence or walking rate (e.g., in steps per minute) and any changes thereof, gait (e.g., right step length and left step length), balanced and imbalanced stance pressure distribution (e.g., during different phases of walking including the loading stance (foot flat), mid-stance, terminal stance (heel off), and pre-swing stance (toe off)), etc. The data collected can be pre-checkpoint monitoring baseline data to be used to analyze any changes as the individual is subject to security screening at the checkpoint. This occurs in a non-secure area 130 prior to the checkpoint.

The baseline measurements for weight of a passenger may include measurements for the undivested passenger (i.e., passenger is wearing shoes, has things in his/her pockets, potentially carrying or pulling a bag, etc.) and the divested passenger (i.e., passenger is not wearing shoes, has nothing in his/her pockets, not carrying or pulling a bag, etc.). For example, pressure mapping signatures of weight or weight distribution are captured statically of the undivested passenger after he/she enters the airport at the pre-checkpoint kiosk 110, and pressure mapping signatures are captured statically of the divested passenger after he/she enters the checkpoint 140 and becomes divested.

The baseline measurements for walking cadence of a passenger may involve a setup to meter the passenger traffic with several parallel lanes of the covert pre-checkpoint pressure mapping system 120 in a hallway leading to the checkpoint 140. The entry gate will only open after the prior passenger has cleared the covert pre-checkpoint pressure mapping system lane. This design will allow the database to capture pressure mapping signatures dynamically (walking cadence) of a single undivested passenger in a single lane while simultaneously capturing pressure mapping signatures dynamically across multiple passengers in the other parallel lanes. This would also allow an internal camera system to track and monitor the passengers as they walk to the checkpoint 140.

The baseline measurements for balanced/unbalanced stance may include measurements for the undivested passenger and the divested passenger. For example, pressure mapping signatures of balanced/imbalanced stance are captured statically of the undivested passenger after he/she enters the airport at the pre-checkpoint kiosk 110, and pressure mapping signatures are captured statically of the divested passenger after he/she enters the checkpoint at 140 and becomes divested.

Next, the individual reaches the checkpoint 140 and is subjected to checkpoint scanning in a scanning system 150 such as a MMW AIT TSE (Millimeter Wave Advanced Imaging Technology Transportation Security Equipment). A checkpoint pressure mapping system 153 may be covertly set up inside the scanning system 150 and performs pre-scanning monitoring of the individual's weight distribution prior to the duration of the checkpoint scan inside the scanning system 150. The data collected by the checkpoint pressure mapping system 153 is compared with the baseline data collected by the pre-checkpoint pressure mapping system 120. A determination is made as to whether the individual's weight distribution is within tolerance. For instance, an individual's weight distribution is captured by the pre-checkpoint covert pressure mapping system 120 as left foot 100 lbs. and right foot 100 lbs. In one example, the tolerance may be ±10%, i.e., ±10 lbs. or 90-110 lbs. for each foot. The tolerance may be ±20% or ±5% in other examples. The tolerance may be a preset standard, or it may be customized or adjustable depending on the situation or subjected to the discretion of the operator. If the weight distribution is within tolerance, the checkpoint scanning may proceed. Otherwise, the individual is reset to the proper stance until the weight distribution falls within the tolerance. For example, the system would alert the security officer to not scan the individual until that individual balances the pressure distribution per the standard or custom baseline. This pre-scanning monitoring process ensures that the image quality of the checkpoint scan is satisfactory for the Automatic Threat Recognition (ATR) algorithm to properly detect anomalies. In some embodiments, the monitoring process may continue and extend into and possibly throughout the duration of the checkpoint scan inside the scanning system 150, to ensure the proper stance is maintained during the checkpoint scan.

This can be referred to as the scanning monitoring process which occurs after the pre-scanning monitoring process.

Figure 1A:
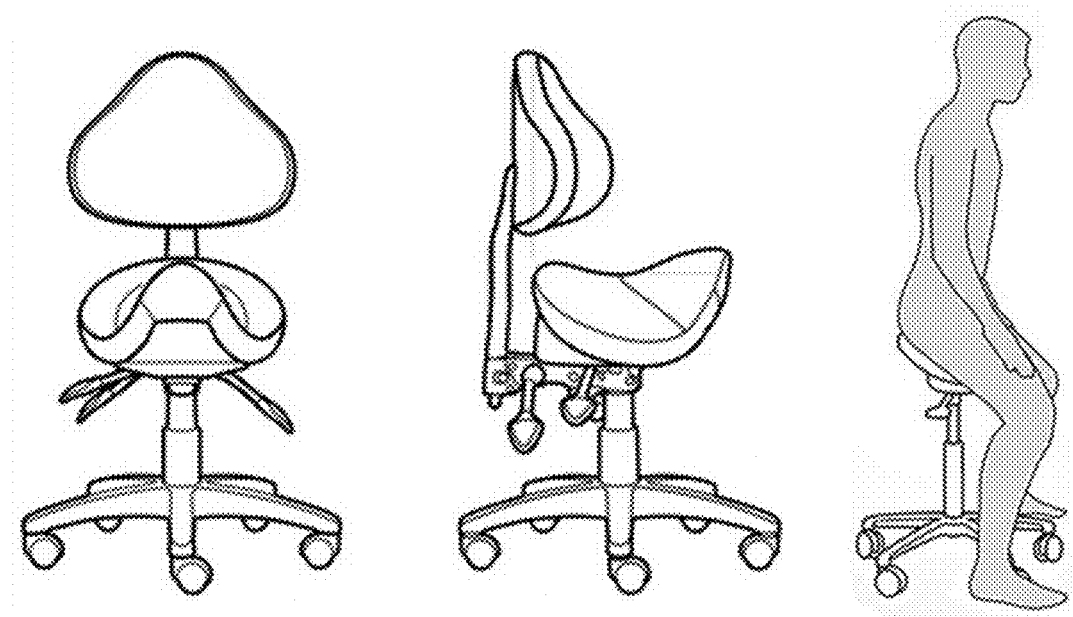
FIG. 1A shows different examples of saddle chairs and saddle stools.

The ATR software examines physical items or human body scan data to detect areas where contraband can be kept hidden. A determination is made as to whether there are any anomaly indicators. If the scanning system 150 displays no anomaly indicators, the individual is directed to the secure area 160. If the scanning system 150 displays one or more anomaly indicators, a determination is made as to whether the anomaly is in a sensitive area of the body of the individual. If yes, the individual is subjected to sensitive area screening 170 involving the use of a sensitive area pressure mapping system 172, which may be integrated via a seat or saddle 174. FIG. 1A shows different examples of saddle chairs and saddle stools, which can be immobilized by removing the wheels or otherwise affixed to the floor. If the anomaly is not in a sensitive area or if sensitive area screening 170 is not available or not in operation, the individual is subjected to standard or conventional secondary screening 180. The secondary screening 180 is performed by hand and may involve the use of a handheld scanner or scanner gloves which may include pressure mapping sensors and/or other sensors for detecting the presence of hidden objects or other anomalies.

Pressure Mapping & Alarm Resolution System

Figure 2:
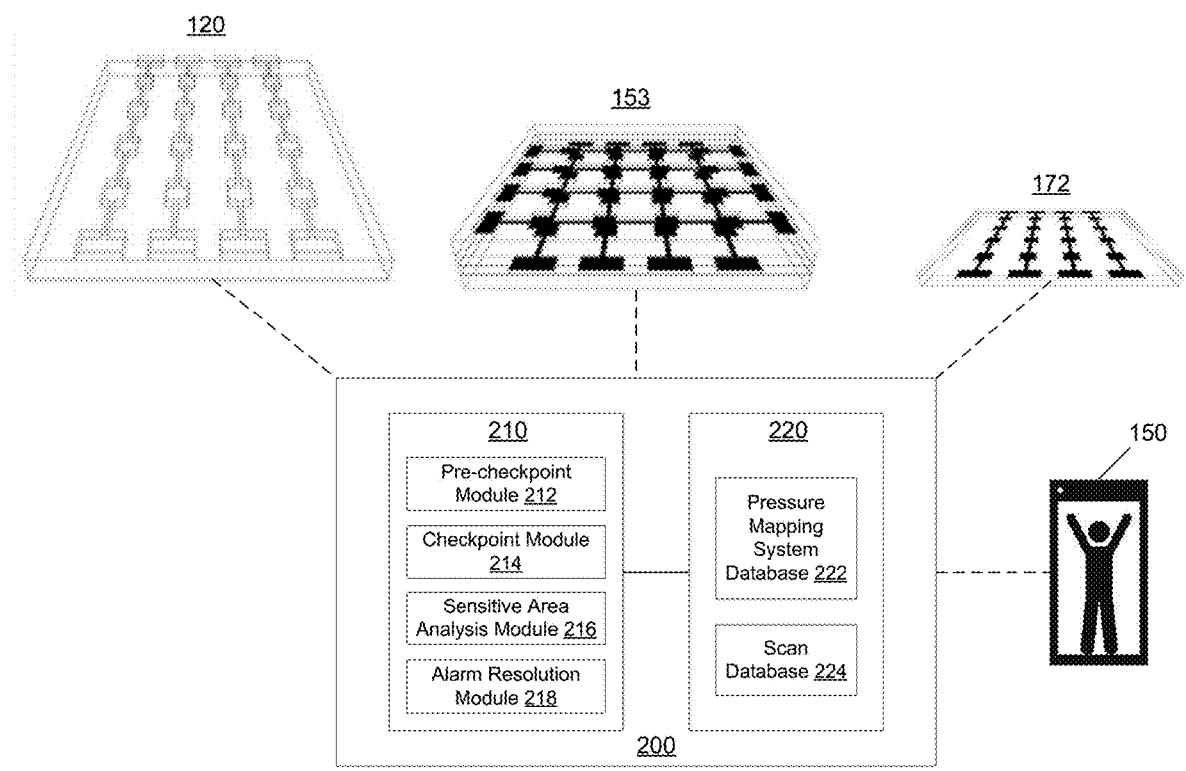
FIG. 2 is a schematic illustration of a system for pressure mapping monitoring and alarm resolution according to an embodiment.

FIG. 2 is a schematic illustration of a system for pressure mapping monitoring and alarm resolution according to an embodiment. The computing system 200 is used for performing pressure mapping and alarm resolution processes based on input from the pre-checkpoint pressure mapping system 120, the scanning system 150, the checkpoint pressure mapping system 153, and the sensitive area pressure mapping system 172. The computing system 200 can be used to implement some or all of the processes or operations of the pre-checkpoint pressure mapping system 120, the scanning system 150, the checkpoint pressure mapping system 153, and the sensitive area pressure mapping system 172 in FIG. 1.

The computer 200 includes a processor 210 and a memory 220. The processor 210 comprises a pre-checkpoint module 212 for performing the pre-checking monitoring process, a checkpoint module 214 for performing a checkpoint monitoring process which includes the pre-scanning monitoring process and the scanning monitoring process, a sensitive area analysis module 216 for performing a sensitive area analysis, and an alarm resolution module 218 for performing an alarm resolution process. The memory 220 includes the pressure mapping system database 222 for storing data from the pressure mapping systems 120, 153, 172, and a scan database 224 for storing data from the scanning system 150.

Pressure mapping is the measurement and visualization of pressure and its distribution when two surfaces come into contact. The measurement is usually performed by a high-tech, thin, flexible, semiconductor sensor.

A pressure mapping system measures pressure across the area between two contacting surfaces, collects data about force distribution, and then turns the tactile pressure into a 2D or 3D map showing the areas of highest impact and strain. The pressure mapping system includes a pressure mapping sensor, also known as a tactile sensor, that measures real-time surface pressure distribution between two surfaces. It further includes an electronic device or a computer which displays the collected data from sensing points in a visual form. The computer has data processing electronics and may include a specifically designed software. The user uses this information to analyze the peak pressure areas and better understand the surface behavior. There are two main types of sensors: resistance-based or capacitance-based. A resistive sensor works by measuring changes in the resistance of a semi-conductive materials, while a capacitive sensor measures the changes in the gap distance between two electrodes. The pressure is then converted into electrical signals, which are processed by the electronics and displayed on a computer display. A typical sensor is a thin flexible sensor. The sensor will undergo a calibration process to ensure all data are collected and displayed accurately. Unlike load cells, thin and flexible pressure sensors have the ability to measure pressures over large areas and from large amount of pressure points. Calibrated systems provide precise data collection within the specified range. Collected data is displayed in a graphic form, enabling 2D or 3D analysis of the pressure distribution. These recordings can be analyzed in real time and/or saved for future reference.

Tactile sensing is the technology of mapping and measuring the contact mechanics between two objects. Pressure measurement and mapping may involve the use of capacitive sensors or resistive sensors. Resistive sensors work through measuring the resistance of a conductive material. Capacitive sensors work through measuring the ability to store an electrical charge. Though more expensive to produce, capacitive sensors outcompete traditional resistive sensors in nearly every aspect including design flexibility, sensitivity, repeatability, and temperature stability. Tactile capacitive sensing represents the forefront of capacitive sensing. Tactile measurement goes beyond by portraying the magnitude and distribution of contact pressures between two objects over an area as a matrix. The benefits of capacitive technology are that the two electrodes never touch and they operate in an elastic region, so that the sensor is more sensitive and stable. Another key benefit is that electrodes can be formed from any conductive material (e.g., conductive cloth, FPCB, metal fixtures) giving the sensors a wide range of design flexibility. Capacitive sensing has emerged as a preferred method for capturing contact-based pressure changes due to sensitivity, repeatability, stability, and design flexibility.

Capacitance is a measure of an object's ability to store electrical charge and has been demonstrated countless times through the classic physics class example of two electrodes with area A separated by an air gap D. As the air gap decreases, the capacitance C increases. This property is used to build sensor pads and arrays by separating the electrodes, for example, using a compressible dielectric matrix, which acts as a spring. Precision manufacturing techniques provide excellent repeatability and sensitivity, while advanced conductive materials allow for conformable, stretchable, industrial, and other hybrid sensor designs. The simplicity of the capacitive sensor design provides a large degree of flexibility when creating custom sensor solutions. To build the tactile array sensors, the electrodes may be arranged as orthogonal, overlapping strips separated by a proprietary compressible dielectric matrix, which acts as a spring. A distinct capacitor is formed at each point where the electrode strips overlap. By selectively scanning a single row and column, the capacitance, or local pressure, at that location is measured. Drive and conditioning electronics may be configured to scan through an array at high speed while optimizing settings to achieve the maximum sensor response from each sensing element.

COTS (Commercial Off The Shelf) pressure sensor can be used to performing pressure mapping and associated software may be used to develop a threshold for each of various improper stance scenarios that will result in an alarm to the security check operator who will direct the individual to be rescanned. An example is Tactilus® Real-Time Surface Pressure Mapping Technology which allows the user to capture and record pressure conditions occurring in between any two contacting or impacting surfaces in real time. The paper-thin Tactilus® sensor is placed at the contact interface where it records and assimilates both pressure distribution and pressure magnitude on the computer 200. The sensor includes a series of interlaced lines that create a matrix with hundreds or thousands of unique sensing points. Advances in conductive textiles have enabled the development of tactile sensors that conform to curved surfaces. The sensors can also stretch to alleviate shearing effects caused by shifting contact surfaces. The electronics can be safely encapsulated on the sensor element.

In addition to pre-scanning monitoring, the checkpoint pressure mapping system 153 at the scanning system 150 can also detect when the individual moves or shifts weight instead of standing still for the scan. The security checkpoint operator can direct the individual or subject to exit the scanning system 150 and re-enter for scanning.

One approach uses a piezo-based pressure sensor for checking the individual's feet pressure map for fitting orthotics. The associated software can collect and store the pressure distribution over time. The piezo-bases pressure sensor may be selected from available COTS sensors that is deemed suitable, including piezoresistive sensors. The piezo-based pressure sensor can be used for pressure monitoring before and during the checkpoint scan to find a threshold between detecting when the stance is unacceptable (at or above the threshold) thereby needing rescanning and detecting when the stance is acceptable (below the threshold) such that the TSO (Transportation Security Officer) can rely on the avatar seen in the checkpoint scan and pass the person through.

The sensors of the checkpoint pressure mapping system 153 would be mounted to the floor of the AIT system 150 (see FIG. 1). In one example, two piezo-based pressure sensors are used. With the shoes removed, the passenger will be standing on bare feet or with socks/stocking only over the two pressure sensors. As such, there is no threshold between the feet and the checkpoint pressure mapping sensor(s) other than a sock or stocking etc. The associated software conducts real-time analysis. It may be specially programmed or designed to perform tracking over time, of the high precision/tolerance on the signal from the pressure sensors. Examples of key metrics include total force, peak pressures, center of force, and pressure distribution. The scan rates may be about 50 to 200 Hz. The sensor resolution may be up to 25 sensels/in$^2$. The passenger undergoes body scanning inside the MMW AIT TSE 150. The pressure sensor software determines if passenger moves too much during the body scan which would require rescanning the passenger or pass the passenger into the sterile/secure side of the checkpoint.

Figure 2A:
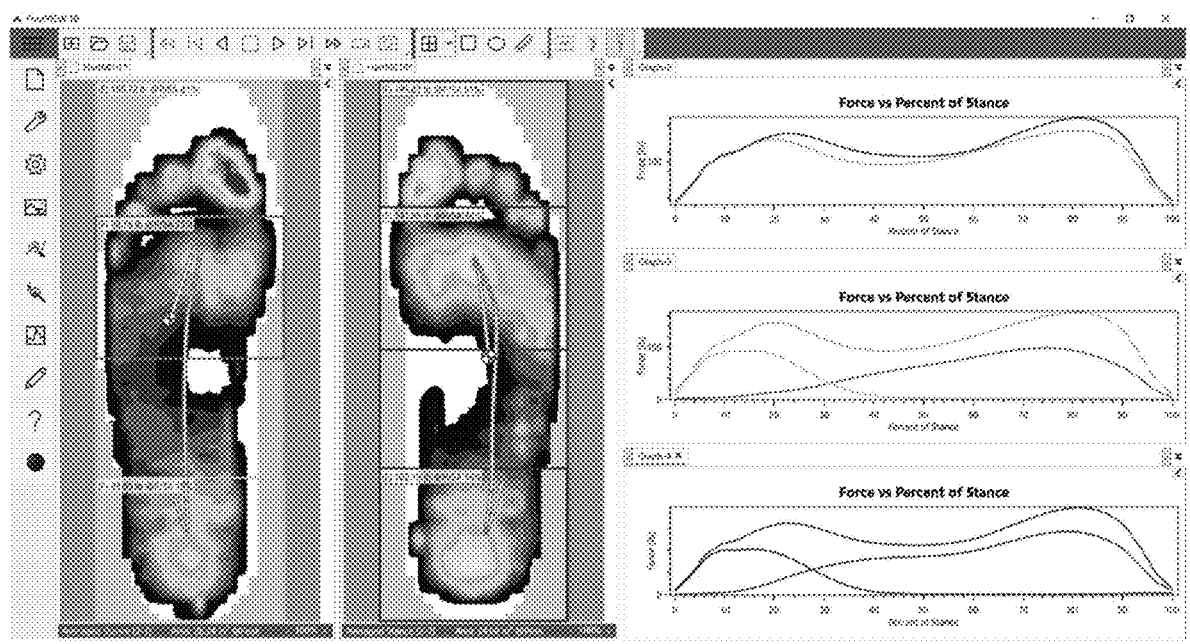
FIG. 2A shows an example of a scanning image obtained by a foot pressure analysis system.

FIG. 2A shows an example of a scanning image obtained by a foot pressure analysis system such as Tekscan's pressure analysis systems for assessing foot function through force and pressure distribution analysis, including the Strideway™ platform or pressure measurement mat which is a modular pressure platform system for gait measurement with spatial temporal data. This is an example of a pre-checkpoint pressure mapping system 120.

Figure 2B:
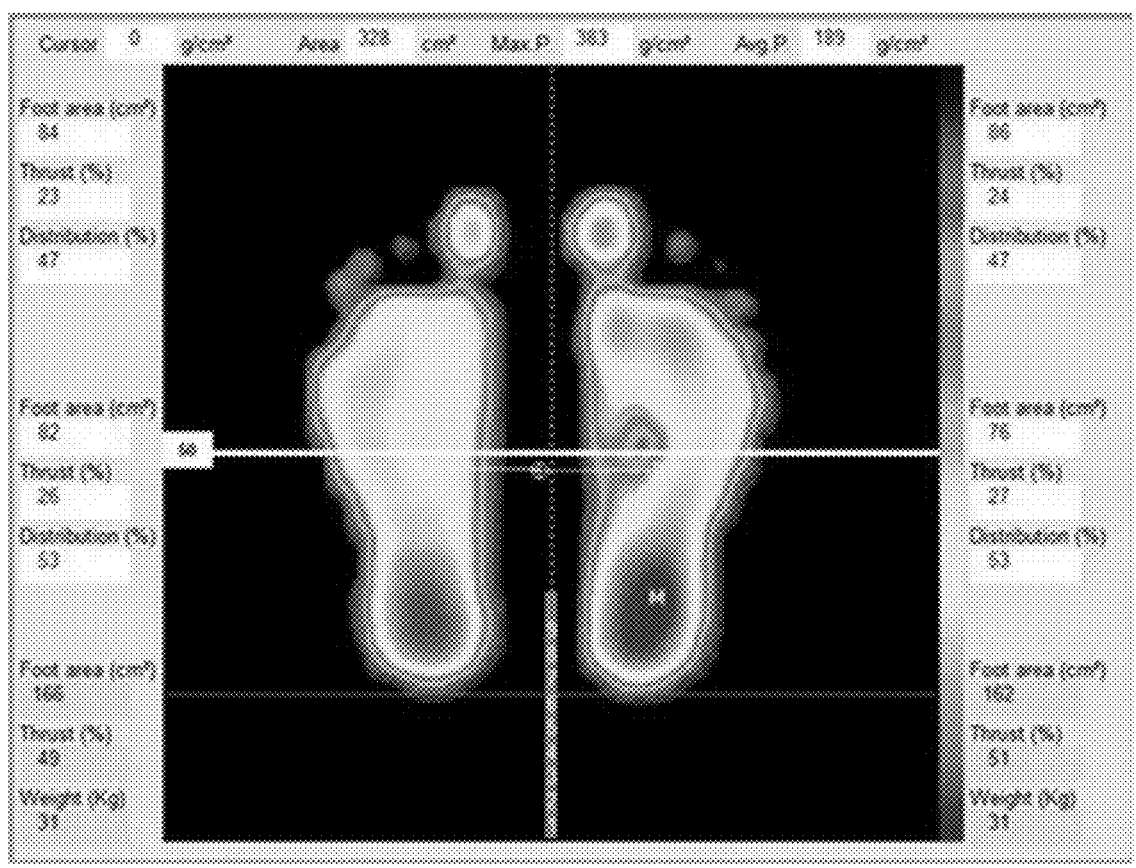
FIG. 2B shows a scanning image obtained by a foot pressure mapping system or foot scanner.

FIG. 2B shows a scanning image obtained by a foot pressure mapping system or foot scanner such as those sold by Diabetik Foot Care India Pvt Limited. This is an example of a checkpoint pressure mapping system 153.

Pre-Checking Monitoring

Figure 3A:
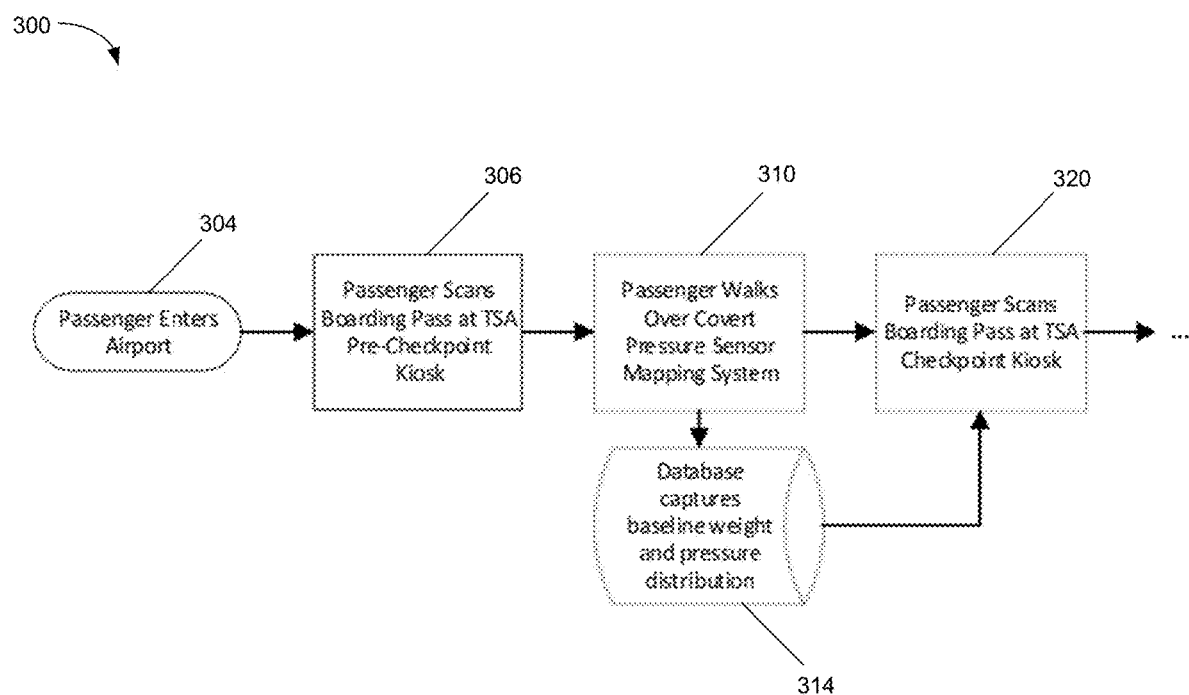
FIGS. 3A-3B show a flow diagram illustrating an example of a pre-checkpoint monitoring process.
Figure 3B:
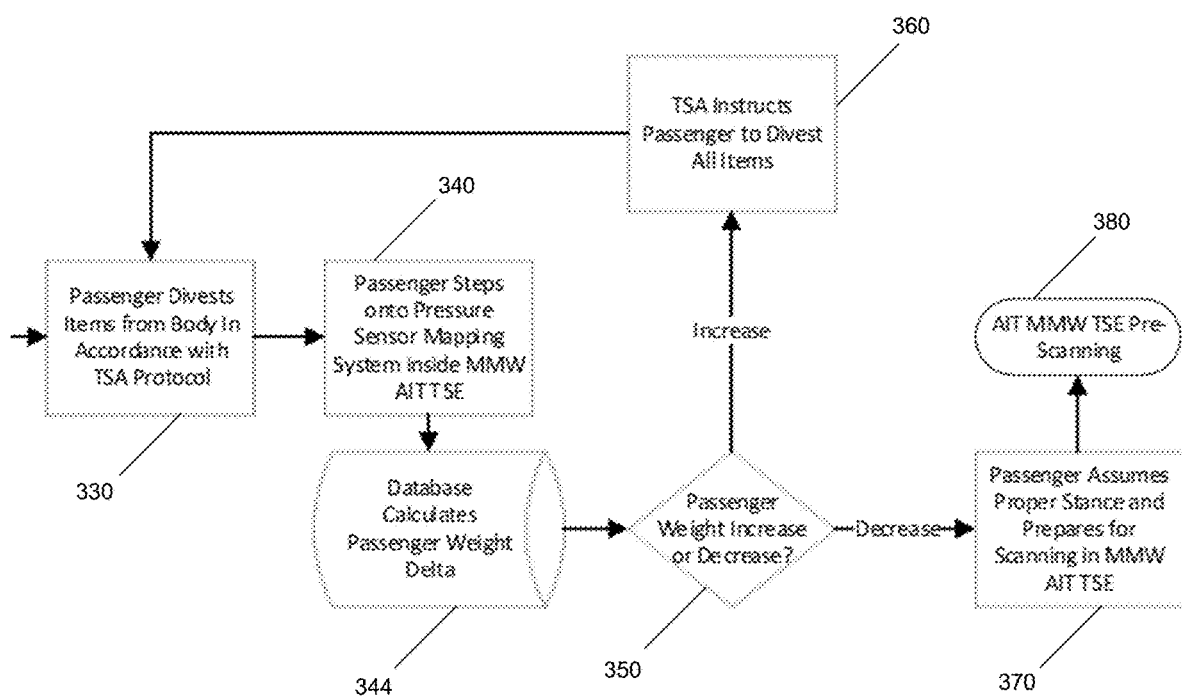

FIGS. 3A-3B show a flow diagram 300 illustrating an example of a pre-checkpoint monitoring process. After a passenger enters an airport (step 304) and scans the boarding pass at the TSA pre-checkpoint kiosk 110 (step 306), the passenger walks over the pre-checkpoint pressure mapping system 120 (step 310) toward the TSA Checkpoint 140. The pre-checkpoint pressure mapping system 120 is covertly set up in the non-secure area 130 of the airport prior to reaching the TSA Checkpoint 140. It can be used to baseline the aviation passenger's weight, walking cadence, balanced and imbalanced stance pressure distribution, and the like. In step 314, this data is captured in the pressure mapping system database 222 to track trends and monitor changes in passengers' weight and pressure distributions as they walk to the TSA Checkpoint. The pressure mapping system database 222 can be used to analyze changes in weight and imbalance of passengers both within a single airport visit and between visits.

During a single airport visit, the passenger scans his/her mobile or paper boarding pass at the TSA pre-checkpoint kiosk 110 to initiate the pre-checkpoint monitoring process (step 306). The passenger walks over the covert pressure mapping system 120 from the non-secure area 130 of the airport to the TSA Checkpoint 140 (step 310). Next, the passenger scans his/her mobile or paper boarding pass at the TSA Checkpoint (step 320), which may be an unattended kiosk for machine scanning or an attended desk for manual scanning. The passenger divests all items (e.g., jackets, shoes, belts, cell phones, wallets, keys, etc.) in accordance with TSA protocol (step 330), and steps on the checkpoint pressure mapping system 153 (which may be covert) within the Millimeter Wave (MMW) Advanced Imaging Technology (AIT) Transportation Security Equipment (TSE) (step 340). Using the data in the pressure mapping system database 222, a pre-checkpoint module 212 quickly calculates the delta in the passenger's weight from the non-secure area 130 of the airport to the MMW AIT TSE 150 (step 344). In step 350, the pre-checkpoint module 212 determines whether the passenger's weight has increased or decreased. If the passenger's weight delta has increased (i.e., the passenger has possibly obtained a threat or non-threat item), the pre-checkpoint module 212 provides a visual "red light" indicating to the TSA to instruct the passenger to divest all items prior to re-entering the MMW AIT TSE and assuming the proper stance for scanning (step 360). If the passenger's weight delta has decreased (i.e., the passenger has properly divested items), the pre-checkpoint module 212 provides a visual "green light" indicating to the TSA the passenger can now assume the proper stance inside the MMW AIT TSE and prepare for scanning (step 370). The MMW AIT TSE pre-scanning monitoring process starts at step 380.

During each new airport visit, steps 304 to 380 are repeated. The pre-checkpoint module 212 uses the pressure mapping system database 222 in pre-checkpoint monitoring to re-baseline the aviation passengers and maintains a historic log of any prior pre-checkpoint monitoring (e.g., from any prior airport visits) for further trend analysis (see step 314).

As used herein, re-baselining an individual means after the passenger has exited the airport (i.e., departed on an airplane) and then when the passenger re-enters the airport (step 304) for another flight, the passenger's baseline values (i.e., the pressure mapping signatures) previously captured for weight, walking cadence, and balanced/imbalanced stance pressure distribution are reset to zero. The passenger's new baseline is captured for weight, walking cadence, and balanced/imbalanced stance pressure distribution by completing steps 306, 310, and 314 in FIG. 3A. The database then conducts a comparison of the passenger's current weight, walking cadence, and balanced/imbalanced stance to the passenger's historic weight, walking cadence, and balanced/imbalanced stance and determines if the delta is statistically significant (e.g., passengers historic divested weight=200 lbs. but for a flight 1-week later the same passengers current divested weight=250 lbs.). The presence of a statistically significant delta alerts the local security to investigate that passenger to determine why there is such a drastic change.

Checkpoint Scanning

The checkpoint pressure mapping system 153 which is set up inside the MMW AIT TSE 150 at the TSA Checkpoint 140 may be covert. Using the pressure mapping system database 222, the pre-checkpoint module 212 in pre-checkpoint monitoring process is configured to monitor the passenger's baseline weight distribution and compare it to the passenger's weight distribution while standing inside the MMW AIT TSE 150. The checkpoint monitoring process is configured to monitor the passenger's weight distribution before (pre-scanning) and throughout (scanning) the duration of the scan inside the MMW AIT TSE. This checkpoint monitoring process ensures that the image quality of the scan is satisfactory for the Automatic Threat Recognition (ATR) algorithm to properly detect anomalies.

MMW AIT TSE Pre-Scanning Monitoring

Figure 4:
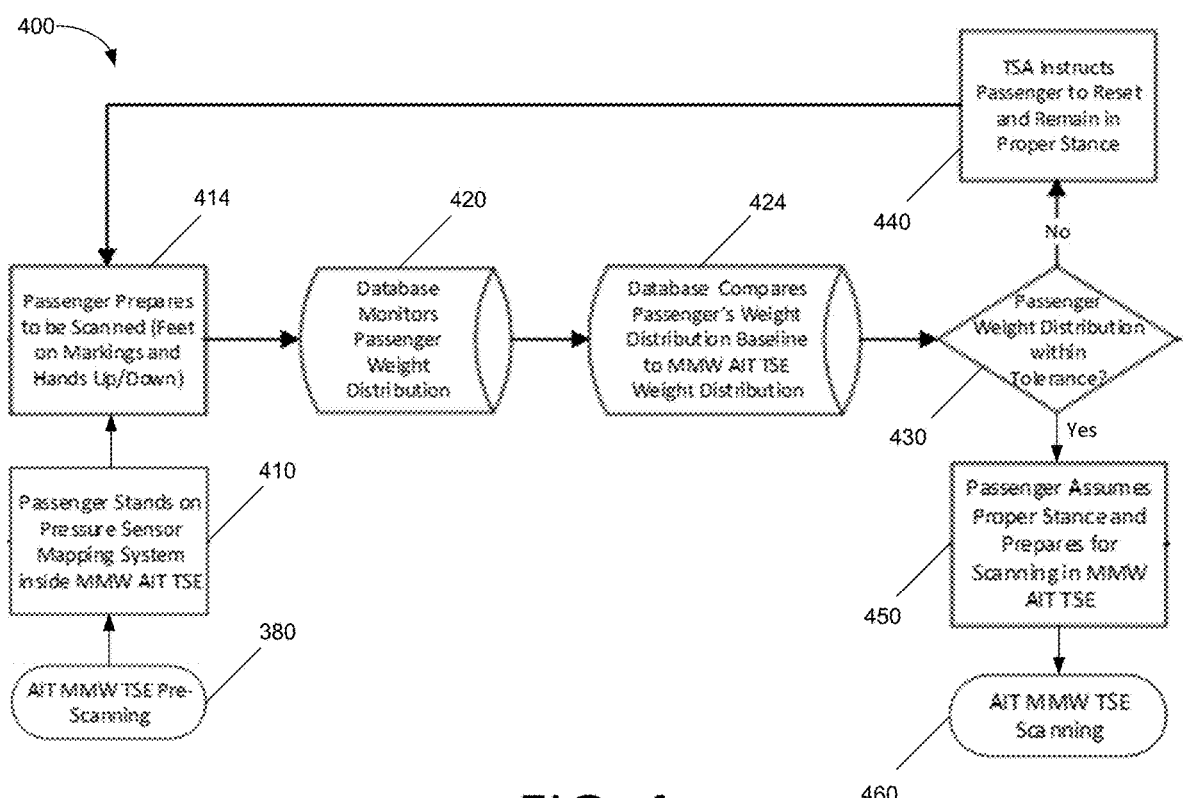
FIG. 4 is a flow diagram illustrating an example of a pre-scanning monitoring process.

FIG. 4 is a flow diagram 400 illustrating an example of a pre-scanning monitoring process. The MMW AIT TSE pre-scanning monitoring process starts at step 380. The passenger stands on the checkpoint pressure mapping system 153 inside the MMW AIT TSE 150 (step 410) and prepares to be scanned (i.e., feet on markings and hands up or down) (step 414). In step 420, a checkpoint module 214 monitors the passenger's weight distribution before the TSO initiates the MMW AIT TSE scanning procedure. In step 424, using the data in the pressure mapping system database 222, the checkpoint module 214 compares the passenger's weight distribution captured in the pre-checkpoint pressure mapping system 120 from the non-secure area 130 of the airport to the passenger's weight distribution captured inside the MMW AIT TSE 150.

More broadly, the pre-scanning monitoring data is compared with the baseline data to determine whether the pre-scanning monitoring data falls below a pre-scanning threshold which is within a pre-scanning tolerance of the baseline data. The individual is directed to reset his or her stance at the scanning system until the pre-scanning monitoring data is below the pre-scanning threshold before scanning the individual at the scanning system.

In step 430, for example, the checkpoint module 214 determines whether the passenger's weight distribution is within a pre-scanning tolerance (i.e., below the pre-scanning threshold). The tolerance may be an established tolerance or a preset tolerance at, for example, ±10% or ±5% or ±2%. If the passenger's weight distribution inside the MMW AIT TSE 150 is significantly different (e.g., to an established tolerance) from the baseline weight distribution obtained from the pre-checkpoint pressure mapping system 120 during pre-checkpoint monitoring, the checkpoint module 214 provides a visual "red light" indicating to the TSO, who will then instruct the passenger to reset and remain in the proper stance for the duration of a scan (step 440). Steps 414, 420, 424, and 430 are repeated until the passenger weight distribution falls within the pre-scanning tolerance. If the passenger's weight distribution inside the MMW AIT TSE 150 is the same as or is close to (e.g., to an established pre-scanning tolerance or a preset pre-scanning tolerance) the baseline weight distribution from the pre-checkpoint pressure mapping system 120, the checkpoint module 214 provides a visual "green light" indicating to the TSO the need to instruct the passenger to remain in the proper stance for the duration of a scan (step 450) and then activates the MMW AIT TSE 150 to scan the passenger (step 460).

MMW AIT TSE Scanning Monitoring

Figure 5:
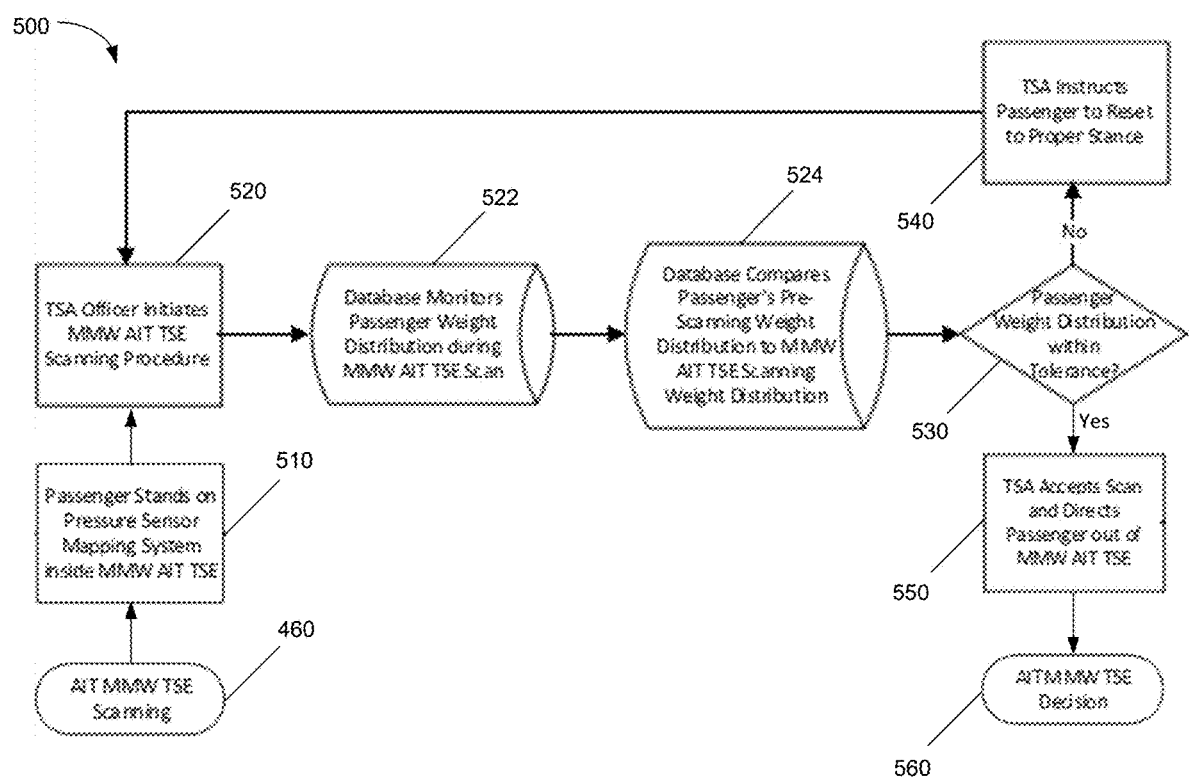
FIG. 5 is a flow diagram illustrating an example of a scanning monitoring process.

FIG. 5 is a flow diagram 500 illustrating an example of a scanning monitoring process. The MMW AIT TSE scanning process starts at step 460. In step 510, the passenger stands on the checkpoint pressure mapping system 153 inside the MMW AIT TSE 150 and in the proper stance (i.e., feet on markings and hands up or down). In step 520, the TSO initiates the MMW AIT TSE scanning procedure. In step 522, the checkpoint module 214 monitors the passenger's weight distribution during the duration of the MMW AIT TSE scan. In step 524, the checkpoint module 214 compares the passenger's weight distribution captured during pre-scanning (step 420) to the passenger's weight distribution captured during scanning inside the MMW AIT TSE (step 522).

More broadly, the scanning monitoring data is compared with the pre-scanning monitoring data to determine whether the scanning monitoring data falls below a scanning threshold which is within a scanning tolerance of the pre-scanning monitoring data. If not, the individual is directed to reset his or her stance at the scanning system until the scanning monitoring data is below the scanning threshold before resuming scanning the individual at the scanning system.

In step 530, for example, the checkpoint module 214 determines whether the passenger's weight distribution is within a scanning tolerance (i.e., below the scanning threshold). The tolerance may be an established tolerance or a preset tolerance at, for example, ±10% or ±5% or ±2%. If the passenger's weight distribution during the MMW AIT TSE scan is significantly different (to an established scanning tolerance or a preset scanning tolerance) from the weight distribution from pre-scanning, the checkpoint module 214 provides a visual "red light" indicating to the TSA to instruct the passenger to reset to the proper stance (step 540), and the TSO will rescan the passenger (steps 520 to 530). For instance, the individual resets the stance at the scanning system (MMW AIT TSE) until the individual's weight distribution of the pre-scanning monitoring data is within the scanning tolerance of the individual's weight distribution of the pre-scanning data (i.e., pre-scanning weight distribution). If the passenger's weight distribution during the MMW AIT TSE scan (step 522) is or is close to the same (to an established tolerance or a preset tolerance) as the weight distribution from pre-scanning (step 420), the checkpoint module 214 provides a visual "green light" indicating to the TSA to accept the scan and direct the passenger out of the MMW AIT TSE (step 550). The passenger moves on to the MMW AIT TSE decision in step 560.

Alternatively, step 524 may involve comparing the scanning monitoring data with the baseline data instead of the pre-scanning monitoring data to determine whether the scanning monitoring data falls below an alternative scanning threshold which is within an alternative scanning tolerance of the baseline data. The individual is directed to reset his or her stance at the scanning system until the scanning monitoring data is below the alternative scanning threshold before resuming scanning the individual at the scanning system. In one example, step 524 compares the passenger's weight distribution captured baseline data (obtained from the pre-checkpoint pressure mapping system 120 during pre-checkpoint monitoring) to the passenger's weight distribution captured during scanning inside the MMW AIT TSE (step 522).

Undue delay in screening may occur from multiple loops of repeating steps 520, 522, 524, 530, and 540 caused by repeated NO decisions in step 530. One solution, for example, is to direct the passenger to receive secondary screening after a preset number of NO decisions (e.g., after two NO decisions) in step 530. Another solution is to direct the passenger to receive secondary screening after the passenger has undergone the checkpoint scanning or MMW AIT TSE scanning for more than a preset amount of time (e.g., 5 minutes). Alternatively, a security protocol or policy may be provided a priori. The security officer will deal with this situation according to the security protocol or policy on a case-by-case basis.

The sensitive area pressure mapping system 172, which may be integrated via the seat 174, is used to resolve alarms from the MMW AIT TSE 150 specifically in the sensitive area of the groin. The passenger or individual undergoing sensitive area monitoring will sit on the chair/saddle 174 to receive sensitive area monitoring by the integrated sensitive area pressure mapping system 172. One may capture baseline and anomaly data using a wide variety of mock passengers or test individuals to establish acceptable thresholds per gender and Body Mass Index (BMI) categories. For example, a large sample of mock passengers representing a wide variety of characteristics (gender, weight, height, etc.) will sit on a seat or saddle 174 with an integrated sensitive area pressure mapping system 172 with no objects in their groin zones for collecting baseline pressure distributions. A variety of threat and non-threat objects will then be inserted in their groin zones for collecting pressure distributions and determining acceptable tolerances with respect to the baseline pressure distributions. A pressure distribution outside the acceptable tolerances indicates an anomaly. The data and thresholds will be loaded into the pressure mapping system database 222. The appropriate baseline data threshold(s) corresponding to a given category of gender and BMI will be used for comparison to real time passenger monitoring data. The real time passenger monitoring data is acceptable if it does not exceed the baseline threshold(s). The baseline threshold(s) can be established a priori based on experiments on test individuals with at least one of a threat item or a non-threat item in sensitive areas and test individuals without threat items and without non-threat items in sensitive areas. For instance, the baseline and anomaly data will be generated a priori by having the mock passengers or test individuals be fully divested (i.e., only outer clothing layer and underwear) in the groin region of the body. They will then sit on the chair/saddle 174 with the integrated sensitive area pressure mapping system 172 and the resulting signal data will be collected as baseline data. Anomaly data will be generated by having the mock passengers attach threat or non-threat items to the groin region of the body inside their outer clothing layer. They will then sit on the chair/saddle 174 with the integrated sensitive area pressure mapping system 172 and the resulting signal data will be collected as anomaly data.

MMW AIT TSE Alarm Resolution

Figure 6:
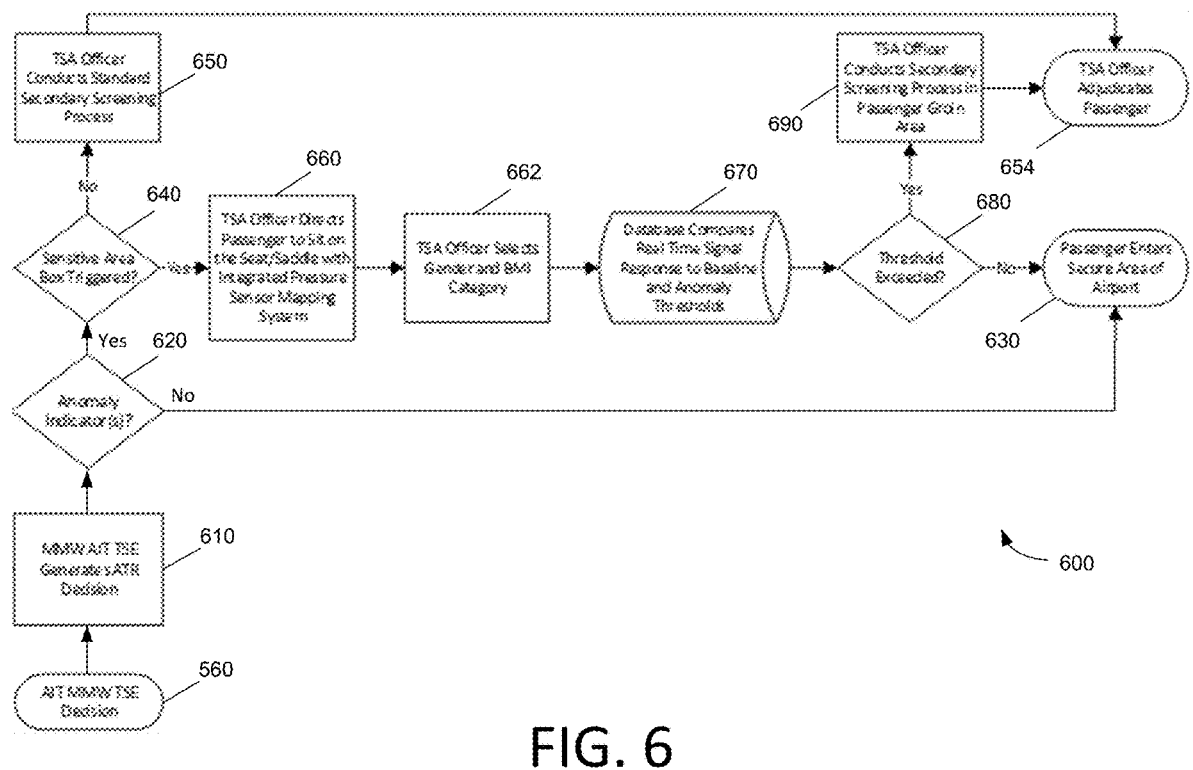
FIG. 6 is a flow diagram illustrating an example of an alarm resolution process.

FIG. 6 is a flow diagram 600 illustrating an example of an alarm resolution process. The MMW AIT TSE Decision process starts at step 560.

In step 610, the TSO examines the display of the MMW AIT TSE 150 and awaits the ATR decision. The ATR software examines physical items or human body scan data to detect areas where contraband can be kept hidden. These identified sections are flagged on a standardized display to inform the security officer the areas on which to perform a manual search. Scanners perform automated threat recognition on images to detect threat objects. In the field, EDS (Energy-Dispersive X-ray Spectroscopy) scanners mostly perform automated threat recognition on images to identify threat objects. Enhanced automated threat recognition will improve the detection of threatening items. Advanced automated target recognition algorithms will help enhanced 3D Computed Tomography (CT) Scanners (or other CT-based object detection equipment) by enhancing object recognition techniques, similar to CT scans that are performed at the hospital on brains. Automatic explosives detection algorithms and automated object recognition software, which can detect prohibited items such as weapons, support operators in making fast and accurate decisions. This not only boosts operational efficiency, but also the security outcome.

In step 620, an alarm resolution module 218 determines whether there are any anomaly indicators. If the MMW AIT TSE 150 displays no anomaly indicators, the passenger is directed to pass through the checkpoint to the secure area of the airport (step 630). If the MMW AIT TSE 150 displays one or more anomaly indicators, the alarm resolution module 218 determines whether a Sensitive Area Box is triggered indicating anomaly in the sensitive area of the body of the passenger (step 640). If the MMW AIT TSE 150 displays one or more anomaly indicators (i.e., alarm boxes) outside the passenger's groin area, the TSO conducts the standard secondary screening process (e.g., pat down) per TSA protocol (step 650) and adjudicates the passenger (step 654).

If the MMW AIT TSE 150 displays an anomaly indicator and triggers the Sensitive Area Box, the TSO directs the passenger to sit on the seat/saddle 174 with the integrated pressure mapping system 172 (step 660). Using the sensitive area analysis software or module, the TSO selects the gender and BMI category of the passenger (step 662). In step 670, the sensitive area pressure mapping system 172 captures the real time sensitive area signal response and the sensitive area analysis module 216 compares the sensitive area signal response to the baseline threshold(s) previously established by the security operator and stored in the pressure mapping system database 222. In step 680, the alarm resolution module 218 determines whether the result of the sensitive area signal response exceeds the baseline threshold(s).

If the pressure mapping system database 222 correlates the real time signal response to the anomaly data and exceeds the baseline threshold, the alarm resolution module 218 provides a visual "red light" indicating to the TSO that a secondary screening process is required in the groin area before adjudicating the passenger. The TSO conducts the standard secondary screening process 180 (e.g., pat down) per TSA protocol (step 690) and adjudicates the passenger (step 654). If the pressure mapping system database 222 correlates the real time signal response to the baseline data and does not exceed the baseline threshold, the alarm resolution module 218 provides a visual "green light" indicating to the TSA that the passenger can be directed to the secure area 160 of the airport (step 630).

Computer Implemented Screening Method

Figure 7:
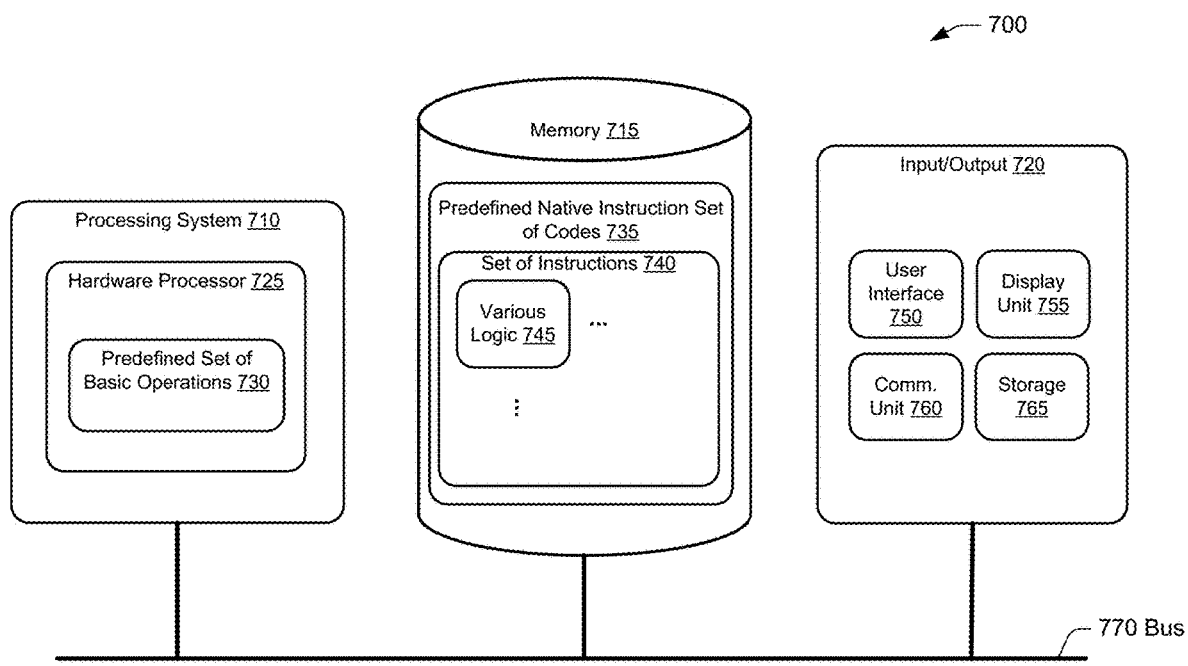
FIG. 7 illustrates a computing system including logic according to an embodiment.

FIG. 7 illustrates a computing system 700 including logic according to an embodiment. The computing system 700 includes a processing system 710 having a hardware processor 725 configured to perform a predefined set of basic operations 730 by loading corresponding ones of a predefined native instruction set of codes 735 as stored in the memory 715. The computing system 700 further includes input/output 720 having user interface 750, display unit 755, communication unit 760, and storage 765. The computing system 700 can be used to implement some or all of the processes or operations of the pre-checkpoint pressure mapping system 120, checkpoint pressure mapping system 153, and sensitive area pressure mapping system 172 in FIG. 1 and FIG. 2, including, for example, the pre-checkpoint monitoring process of FIGS. 3A-3B, the pre-scanning monitoring process of FIG. 4, and/or the scanning monitoring process of FIG. 5.

The memory 715 is accessible to the processing system 710 via the bus 770. The memory 715 includes the pre-defined native instruction set of codes 735, which constitute a set of instructions 740 selectable for execution by the hardware processor 725. In an embodiment, the set of instructions 740 include logic 745 representing various processor logic and/or modules. An example of such logic 745 is set forth in greater detail with respect to the flow diagrams illustrated in FIGS. 3A to 6. Each of the above-mentioned algorithms (e.g., MMWI, neutron imaging, and other detection algorithms and other imaging algorithms) can be a separate system or a module in an overall computer system 700. The various logic 745 is stored in the memory 715 and comprises instructions 740 selected from the pre-defined native instruction set of codes 735 of the hardware processor 725, adapted to operate with the processing system 710 to implement the process or processes of the corresponding logic 745.

A hardware processor may be thought of as a complex electrical circuit that is configured to perform a predefined set of basic operations in response to receiving a corresponding basic instruction selected from a predefined native instruction set of codes. The predefined native instruction set of codes is specific to the hardware processor; the design of the processor defines the collection of basic instructions to which the processor will respond, and this collection forms the predefined native instruction set of codes. A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor. Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

A computer program product is an article of manufacture that has a computer-readable medium with executable program code that is adapted to enable a processing system to perform various operations and actions. Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit. The following forms of storage exemplify non-transitory computer-readable media: removable storage such as a USB disk, a USB stick, a flash disk, a flash drive, a thumb drive, an external SSD, a compact flash card, an SD card, a diskette, a tape, a compact disc, an optical disc; secondary storage such as an internal hard drive, an internal SSD, internal flash memory, internal non-volatile memory, internal DRAM, ROM, RAM, and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Figure 8:
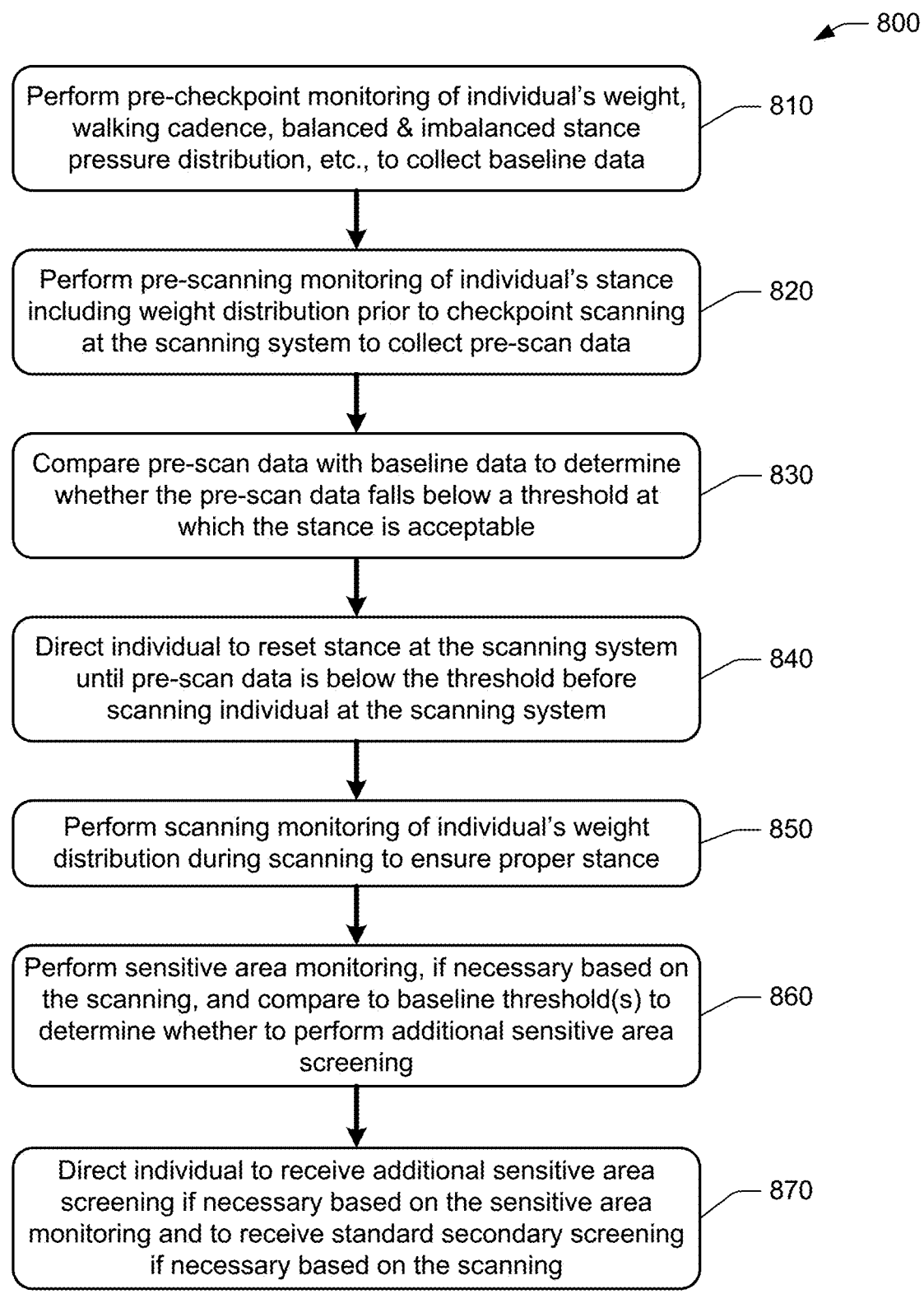
FIG. 8 is a flow diagram illustrating an example of a screening method according to an embodiment.

FIG. 8 is a flow diagram illustrating an example of a screening method according to an embodiment. Step 810 performs a pre-checkpoint monitoring of an individual's weight, walking cadence, balanced & imbalanced stance pressure distribution, etc., to collect pre-checkpoint monitoring baseline data (e.g., FIGS. 3A-3B). Step 820 performs pre-scanning monitoring of the individual's stance including weight distribution and balance prior to the checkpoint scanning at the scanning system to collect pre-scan data or pre-scanning monitoring data (e.g., FIG. 4). Step 830 compares the pre-scan data with the baseline data to determine whether the pre-scan data falls below a pre-scanning threshold, with respect to the baseline data, at which the stance is acceptable (e.g., step 430 in FIG. 4). Step 840 directs the individual to reset the stance at the scanning system until the pre-scan data is below the pre-scanning threshold before scanning the individual inside the scanning system (e.g., steps 440 and 450 in FIG. 4). Step 850 performs scanning monitoring of the individual's weight distribution during the scanning to obtain scanning monitoring data and compares it to the pre-scan data to ensure proper stance when the scanning monitoring data is within a scanning tolerance of the pre-scan data (e.g., FIG. 5). Step 860 performs sensitive area monitoring, if necessary, based on the scanning, and compares the real time sensitive area monitoring data to the baseline threshold(s) previously established and stored in the pressure mapping system database to determine whether to perform additional sensitive area screening (e.g., FIG. 6). Step 870 directs the individual to receive additional sensitive area screening, if necessary, based on the sensitive area monitoring if the real time sensitive area monitoring data exceeds the baseline threshold(s) (e.g., step 690 in FIG. 6) and directs the individual to receive standard or conventional secondary screening, if necessary, based on the scanning if the scanning indicates an anomaly in a nonsensitive area of the individual (e.g., step 650 in FIG. 6).

The inventive concepts taught by way of the examples discussed above are amenable to modification, rearrangement, and embodiment in several ways. For example, while the above description primarily focuses on airport checkpoint security by the TSA, the invention is applicable for a variety of other checkpoint and screening applications beyond the TSA or travel, including nongovernment security or screening, buildings, arenas, event venues, etc. In addition, the above discloses an example of a covert pre-checkpoint pressure mapping system 120 on a level floor between the pre-checkpoint kiosk 110 and the checkpoint 140. In other embodiments, the pressure mapping system 120 may be disposed in a variety of different locations on which individuals may walk prior to reaching the checkpoint 140. The pressure mapping system 120 may further be adapted to a stairs configuration. Accordingly, although the present disclosure has been described with reference to specific embodiments and examples, persons skilled in the art will recognize that changes may be made in form and detail without departing from the spirit and scope of the disclosure.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112(f) is desired only where this description and/or An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A monitoring method for screening an individual, the monitoring method comprising:
   performing a pre-checkpoint monitoring of a stance of the individual as the individual's stance to collect baseline data of the individual's stance including weight distribution and balance of the individual as the individual's weight distribution and balance, measured by a pre-checkpoint pressure mapping system having one or more pre-checkpoint pressure sensors;
   performing a pre-scanning monitoring of the individual's stance at a scanning system at a checkpoint to collect pre-scanning monitoring data of the individual's stance prior to scanning the individual by the scanning system, measured by a checkpoint pressure mapping system having one or more checkpoint pressure sensors; and
   comparing the pre-scanning monitoring data with the baseline data to determine whether the pre-scanning monitoring data falls below a pre-scanning threshold with respect to the baseline data, the individual resetting the individual's stance at the scanning system until the pre-scanning monitoring data is below the pre-scanning threshold with respect to the baseline data before scanning the individual at the scanning system.

2. The monitoring method of claim 1, further comprising:
   performing a scanning monitoring of the individual's stance during the scanning by the scanning system to obtain scanning monitoring data of the individual's stance including the individual's weight distribution and balance, measured by the checkpoint pressure mapping system having the one or more checkpoint pressure sensors; and
   comparing the scanning monitoring data with the pre-scanning monitoring data to determine whether the scanning monitoring data falls below a scanning threshold which is within a scanning tolerance of the pre-scanning monitoring data, the individual resetting the individual's stance at the scanning system until the scanning monitoring data is below the scanning threshold before resuming scanning the individual at the scanning system.

3. The monitoring method of claim 2, further comprising:
   indicating a need for the individual to reset the individual's stance at the scanning system until the individual's weight distribution of the pre-scanning monitoring data is within a preset pre-scanning tolerance of the individual's weight distribution of the baseline data before scanning the individual at the scanning system; and
   indicating a need for the individual to reset the individual's stance at the scanning system until the individual's weight distribution of the scanning monitoring data is within a preset scanning tolerance of the individual's weight distribution of the pre-scanning monitoring data before resuming scanning the individual at the scanning system.

4. The monitoring method of claim 2, further comprising:
   if the scanning by the scanning system indicates an anomaly in a sensitive area of the individual, performing sensitive area monitoring of the individual to obtain sensitive area monitoring data, and comparing the sensitive area monitoring data to a baseline threshold previously established and stored in a pressure mapping system database to determine whether to perform additional sensitive area screening of the individual;

if the scanning by the scanning system indicates an anomaly in a nonsensitive area of the individual, indicating a need for the individual to receive a secondary screening; and if the scanning by the scanning system indicates no anomaly of the individual, indicating a permission for the individual to pass through the checkpoint.

5. The monitoring method of claim 4, wherein performing sensitive area monitoring of the individual comprises:

establishing the baseline threshold a priori based on experiments on test individuals with at least one of a threat item or a non-threat item in sensitive areas and test individuals without threat items and without non-threat items in sensitive areas.

6. The monitoring method of claim 5, further comprising:

collecting baseline pressure distributions of the test individuals representing a variety of characteristics and each sitting on a seat with an integrated sensitive area pressure mapping system, with no threat item and no non-threat item in groin zones of the test individuals as the sensitive areas; and collecting pressure distributions and determining acceptable tolerances with respect to the baseline pressure distributions of the test individuals each sitting on the seat with the integrated sensitive area pressure mapping system, with a threat item or a non-threat item in the groin zones;

wherein a pressure distribution outside the acceptable tolerances indicates an anomaly.

7. The monitoring method of claim 2, wherein performing the scanning monitoring of the individual's stance comprises:

monitoring the individual's weight distribution of the individual standing on the checkpoint pressure mapping system at the scanning system to collect the scanning monitoring data during the scanning of the individual by the scanning system.

8. The monitoring method of claim 2, wherein performing the pre-checkpoint monitoring of the individual's stance comprises monitoring at least one of a weight, a walking cadence or walking rate or any changes thereof, a gait, or a balanced and imbalanced stance pressure distribution of the individual, as the individual walks over the pre-checkpoint pressure mapping system, to collect baseline data including the individual's weight distribution and balance;

wherein performing the pre-scanning monitoring of the individual's stance comprises monitoring the individual's weight distribution of the individual standing on the checkpoint pressure mapping system at the scanning system to collect pre-scanning monitoring data prior to scanning the individual by the scanning system;

wherein performing the scanning monitoring of the individual's stance comprises monitoring the individual's weight distribution of the individual standing on the checkpoint pressure mapping system at the scanning system to collect the scanning monitoring data during the scanning of the individual by the scanning system; and wherein the monitoring method further comprises storing the baseline data, the pre-scanning monitoring data, and the scanning monitoring data in a pressure mapping system database.

9. The monitoring method of claim 1, wherein performing the pre-checkpoint monitoring of the individual's stance comprises at least one of:

monitoring the individual's weight distribution of the individual standing on the checkpoint pressure mapping system at the scanning system to collect pre-scanning monitoring data prior to scanning the individual by the scanning system; or monitoring at least one of a weight, a walking cadence or walking rate or any changes thereof, a gait, or a balanced and imbalanced stance pressure distribution of the individual, as the individual walks over the pre-checkpoint pressure mapping system, to collect baseline data including the individual's weight distribution and balance.

10. The monitoring method of claim 2, further comprising:

visually indicating a need for the individual to reset the individual's stance at the scanning system until the individual's weight distribution of the pre-scanning monitoring data is within a preset pre-scanning tolerance of the individual's weight distribution of the baseline data before scanning the individual at the scanning system; and visually indicating a need for the individual to reset the individual's stance at the scanning system until the individual's weight distribution of the scanning monitoring data is within a preset scanning tolerance of the individual's weight distribution of the pre-scanning monitoring data before resuming scanning the individual at the scanning system.

11. A monitoring system for screening an individual, the monitoring system comprising:

a processor;

a memory;

a pre-checkpoint module configured to perform a pre-checkpoint monitoring of a stance of the individual as the individual's stance to collect baseline data including weight distribution and balance of the individual as the individual's weight distribution and balance; and a checkpoint module configured to perform a pre-scanning monitoring of the individual's stance at a scanning system at a checkpoint to collect pre-scanning monitoring data prior to scanning the individual by the scanning system;

wherein the checkpoint module is configured to compare the pre-scanning monitoring data with the baseline data to determine whether the pre-scanning monitoring data falls below a pre-scanning threshold with respect to the baseline data, the individual resetting the individual's stance at the scanning system until the pre-scanning monitoring data is below the pre-scanning threshold with respect to the baseline data before scanning the individual at the scanning system.

12. The monitoring system of claim 11, wherein the checkpoint module is configured to perform a scanning monitoring of the individual's stance during the scanning by the scanning system to obtain scanning monitoring data including the individual's weight distribution and balance; and wherein the checkpoint module is configured to compare the scanning monitoring data with the pre-scanning monitoring data to determine whether the scanning monitoring data falls below a scanning threshold which is within a scanning tolerance of the pre-scanning monitoring data, the individual resetting the individual's stance at the scanning system until the scanning monitoring data is below the scanning threshold before resuming scanning the individual at the scanning system.

13. The monitoring system of claim 12, further comprising:
a sensitive area analysis module configured, if the scanning by the scanning system indicates an anomaly in a sensitive area of the individual, to perform sensitive area monitoring of the individual to obtain sensitive area monitoring data, and comparing the sensitive area monitoring data to a baseline threshold previously established and stored in a pressure mapping system database in the memory to determine whether to perform additional sensitive area screening of the individual.

14. The monitoring system of claim 13,
wherein the sensitive area analysis module is configured to establish the baseline threshold a priori based on experiments on test individuals with at least one of a threat item or a non-threat item in sensitive areas and test individuals without threat items and without non-threat items in sensitive areas.

15. The monitoring system of claim 12,
wherein performing the pre-checkpoint monitoring of the individual's stance comprises monitoring at least one of a weight, a walking cadence or walking rate or any changes thereof, a gait, or a balanced and imbalanced stance pressure distribution of the individual, as the individual walks over a pre-checkpoint pressure mapping system, to collect baseline data including the individual's weight distribution and balance;
wherein performing the pre-scanning monitoring of the individual's stance comprises monitoring the individual's weight distribution of the individual standing on a checkpoint pressure mapping system at the scanning system to collect pre-scanning monitoring data prior to scanning the individual by the scanning system;
wherein performing the scanning monitoring of the individual's stance comprises monitoring the individual's weight distribution of the individual standing on the checkpoint pressure mapping system at the scanning system to collect the scanning monitoring data during the scanning of the individual by the scanning system; and
wherein the memory comprises a pressure mapping system database to store the baseline data, the pre-scanning monitoring data, and the scanning monitoring data.

16. The monitoring system of claim 15,
wherein the pre-checkpoint module is configured to use the pressure mapping system database during the pre-checkpoint monitoring to re-baseline the individual.

17. The monitoring system of claim 16,
wherein the pre-checkpoint module is configured to maintain, based on the pressure mapping system database, a historic log of any prior pre-checkpoint monitoring of the individual for further trend analysis.

18. The monitoring system of claim 11, further comprising:
a pre-checkpoint pressure mapping system including one or more pre-checkpoint pressure sensors configured to measure a surface pressure distribution of the individual's stance walking over the pre-checkpoint pressure mapping system; and
a checkpoint pressure mapping system including one or more checkpoint pressure sensors configured to measure the surface pressure distribution of the individual's stance of the individual standing on the checkpoint pressure mapping system, to be scanned by the scanning system at the checkpoint.

19. The monitoring system of claim 18,
wherein the checkpoint module is configured to perform the pre-scanning monitoring of the individual's stance based on the surface pressure distribution of the individual's stance standing on the checkpoint pressure mapping system to collect the pre-scanning monitoring data including the individual's weight distribution and balance prior to scanning the individual by the scanning system and to perform a scanning monitoring of the individual's stance based on the surface pressure distribution of the individual's stance standing on the checkpoint pressure mapping system to collect scanning monitoring data including the individual's weight distribution and balance during scanning of the individual by the scanning system; and
wherein the checkpoint module is configured to compare the scanning monitoring data with the pre-scanning monitoring data to determine whether the scanning monitoring data falls below a scanning threshold which is within a scanning tolerance of the pre-scanning monitoring data, the individual resetting the individual's stance at the scanning system until the scanning monitoring data is below the scanning threshold before resuming scanning the individual at the scanning system.

20. A nontransitory computer-readable storage medium storing a monitoring program including instructions that, when executed by a processor, causes a monitoring system for screening an individual to:
perform a pre-checkpoint monitoring of a stance of the individual as the individual's stance to collect baseline data of the individual's stance including weight distribution and balance of the individual as the individual's weight distribution and balance;
perform a pre-scanning monitoring of the individual's stance at a scanning system at a checkpoint to collect pre-scanning monitoring data of the individual's stance prior to scanning the individual by the scanning system; and
compare the pre-scanning monitoring data with the baseline data to determine whether the pre-scanning monitoring data falls below a pre-scanning threshold with respect to the baseline data, the individual resetting the individual's stance at the scanning system until the pre-scanning monitoring data is below the pre-scanning threshold with respect to the baseline data before scanning the individual at the scanning system.

21. The nontransitory computer-readable storage medium of claim 20, wherein the monitoring program further includes instructions that, when executed by the processor, causes the monitoring system to:
perform a scanning monitoring of the individual's stance during the scanning by the scanning system to obtain scanning monitoring data of the individual's stance including the individual's weight distribution and balance; and
compare the scanning monitoring data with the pre-scanning monitoring data to determine whether the scanning monitoring data falls below a scanning threshold which is within a scanning tolerance of the pre-scanning monitoring data, the individual resetting the individual's stance at the scanning system until the scanning monitoring data is below the scanning threshold before resuming scanning the individual at the scanning system.

22. The nontransitory computer-readable storage medium of claim 21, wherein the monitoring program further includes instructions that, when executed by the processor, causes the monitoring system to:

indicate a need for the individual to reset the individual's stance at the scanning system until the individual's weight distribution of the pre-scanning monitoring data is within a preset pre-scanning tolerance of the individual's weight distribution of the baseline data before scanning the individual at the scanning system; and indicate a need for the individual to reset the individual's stance at the scanning system until the individual's weight distribution of the scanning monitoring data is within a preset scanning tolerance of the individual's weight distribution of the pre-scanning monitoring data before resuming scanning the individual at the scanning system.

23. The nontransitory computer-readable storage medium of claim 21, wherein the monitoring program further includes instructions that, when executed by the processor, causes the monitoring system to:

if the scanning by the scanning system indicates an anomaly in a sensitive area of the individual, perform sensitive area monitoring of the individual to obtain sensitive area monitoring data, and compare the sensitive area monitoring data to a baseline threshold previously established and stored in a pressure mapping system database to determine whether to perform additional sensitive area screening of the individual;

if the scanning by the scanning system indicates an anomaly in a nonsensitive area of the individual, indicate a need for the individual to receive a secondary screening; and if the scanning by the scanning system indicates no anomaly of the individual, indicate a permission for the individual to pass through the checkpoint.

* * * * *